INVENTOR
Joseph Armond BOMBARDIER
By Pierre Lesperance
PATENT AGENT

Jan. 22, 1963  J. A. BOMBARDIER  3,074,447
MOTOR VEHICLE FOR CUTTING, LOADING AND TRANSPORTING TREES
Filed April 17, 1961  2 Sheets-Sheet 2
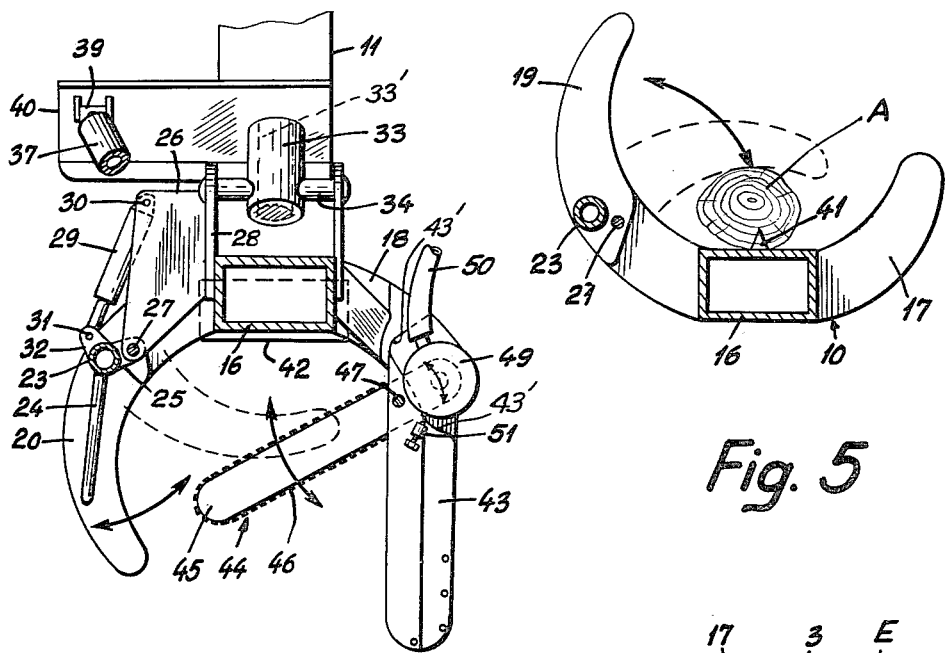
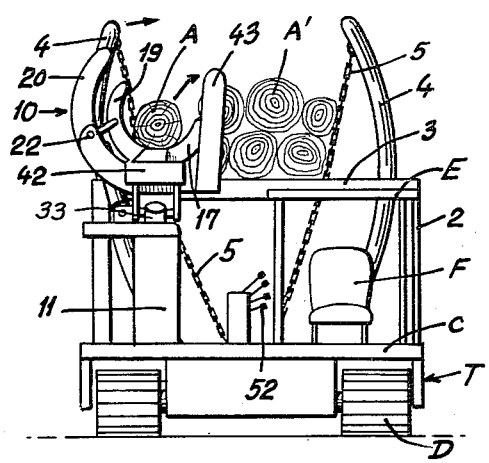
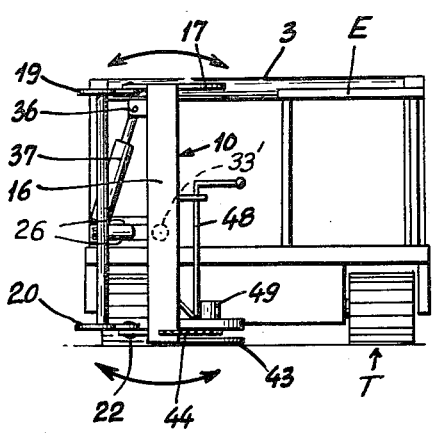
INVENTOR
Joseph Armand BOMBARDIER
By Pierre Lespérance
PATENT AGENT United States Patent Office 3,074,447
Patented Jan. 22, 1963

3,074,447
MOTOR VEHICLE FOR CUTTING, LOADING AND TRANSPORTING TREES
Joseph Armand Bombardier, Valcourt, Quebec, Canada
Filed Apr. 17, 1961, Ser. No. 103,571
7 Claims. (Cl. 144—3)

The present invention relates to forestry operations and more particularly to a machine in the form of a motor vehicle capable of cutting trees, loading the same on the vehicle itself and transporting the trees to another location, said machine being capable of going over rough ground such as in the forest.

The general object of the present invention resides in the provision of means for completely mechanizing the cutting of trees in the forest and their transport to a tree pruning and cutting site.

The machine in accordance with the invention comprises a cutting and loading mechanism preferably mounted on an endless track vehicle which is also provided with tree holding means such as those described and claimed in co-pending patent application of the same inventor Serial Number 74,946, filed December 9, 1960 and entitled: "Tree Holding Means for Motor Vehicles", now U.S. Patent No. 3,008,731 of November 14, 1961.

The apparatus in accordance with the invention is capable of mechanically cutting a tree felling and loading the same on the vehicle, repeating these operations on additional trees, and transporting the trees thus loaded to a pruning and cutting site where each tree is first pruned, then cut into standard logs by a machine described and claimed in co-pending patent application 56,404 filed September 16, 1960 and entitled "Machine for Delimbing and Cutting Trees Into Logs" by the same inventor, now U.S. Patent No. 3,029,848 of April 17, 1962; a part of said machine is also described and claimed in co-pending patent application Serial No. 45,375 filed July 26, 1960 and entitled "Tree Delimbing Jaws" by the same inventor, now U.S. Patent No. 2,989,097 of June 20, 1961.

The assembly of the various apparatus mentioned above forms a new method for felling trees in the forest and cutting the same into logs, which is completely mechanized, is very fast and economical, practically eliminates manual handling and considerably decreases manpower.

The general object of the present invention resides in the provision of a motor vehicle provided with a mechanism which cuts trees in the forest successively one after the other, successively loads these trees over the same vehicle whereby the vehicle can thereafter transport a number of trees any distance required and over rough ground.

A more specific object of the present invention resides in the provision of the vehicle of the character described provided with mechanism which can grasp and cut trees irrespective of the inclination of the trees with respect to the ground.

Another object of the present invention resides in the provision of a mechanism of the character described which is arranged to benefit from the falling of the tree to facilitate the lifting of the trunk and loading of the tree on the vehicle.

Yet another object of the present invention resides in the provision of a vehicle of the character described which is controlled by one man only who is the driver of the vehicle.

Yet another important object of the present invention resides in the provision of a mechanism of the character described which can positively direct the tree during its fall in order to avoid surrounding trees in the forest.

Yet another object of the present invention resides in the provision of a mechanism which can load several trees one after the other on the same vehicle.

The foregoing and other important objects of the present invention will become more apparent during the following disclosure and by referring to the drawings in which:

FIGURE 4 is a plan section of the head looking downwardly towards the lower jaws and also showing the means for attaching the head to the pivotable bracket, the latter being partially shown;

FIGURE 5 is a plan section of the head looking upwardly towards the upper pair of jaws;

FIGURE 6 is a front elevation of the entire vehicle and of the tree handling head in the position of FIGURE 1; and FIGURE 7 is a front elevation of the vehicle showing the head in its loading position and corresponding to that of FIGURE 3.

Figure 1:
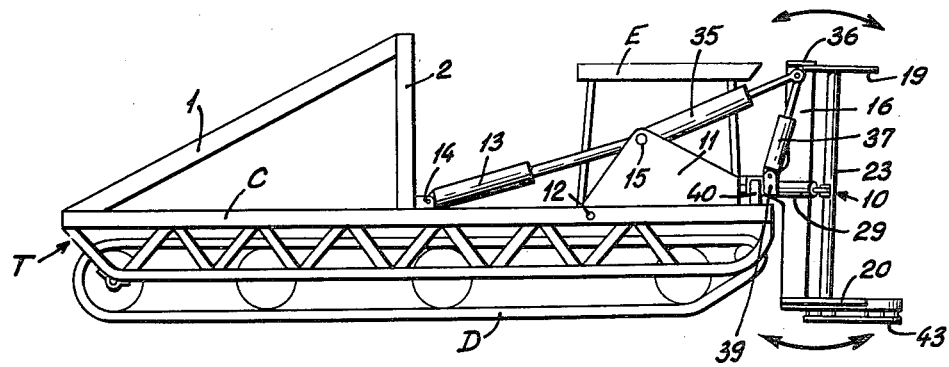
FIGURE 1 is an elevation of an endless track vehicle provided with the mechanism of the invention.

Referring now more particularly to the drawings in which like reference characters indicate like elements throughout, reference letter T indicates an endless track vehicle comprising a frame C, endless tracks D, and provided at the front end thereof with a cab for the driver and consisting of a roof E supported over the seat F for the driver. The latter controls the mechanism in accordance with the invention, and also the mechanism for holding the trees on the vehicle. This latter mechanism is described in a copending application as indicated hereinabove, and comprises an inclined apron 1 disposed at the back of the vehicle and supported by uprights 2 which also support a horizontal transverse member 3 (see FIGURES 6 and 7) and which is adapted to support a stack of tree trunks as indicated at A' in FIGURE 7; this tree holding mechanism further includes arched or curved arms 4 pivoted at their lower ends on the vehicle, and subtending chains or the like flexible elements 5 which are adapted to partially enclose the stack of trees and hold the same on the member 3.

The mechanism in accordance with the invention comprises means for grasping a tree, means for cutting the tree at the trunk base just above the ground, means for directing the fall of the tree towards the back of the vehicle and over the transverse member 3, and means for releasing the tree and depositing the same on said member 3.

Figure 2:
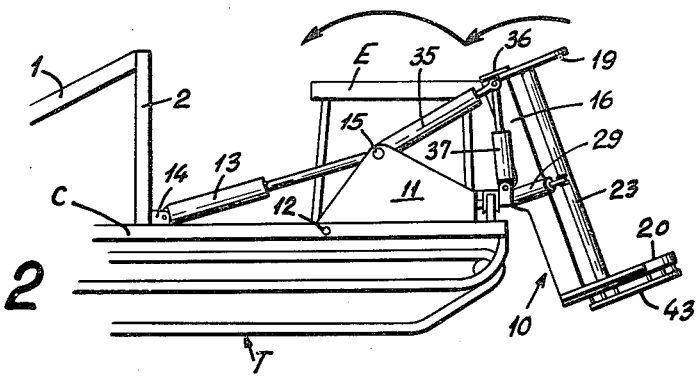
FIGURE 2 is a partial elevation of the front part of the vehicle showing the head in inclined position.
Figure 3:
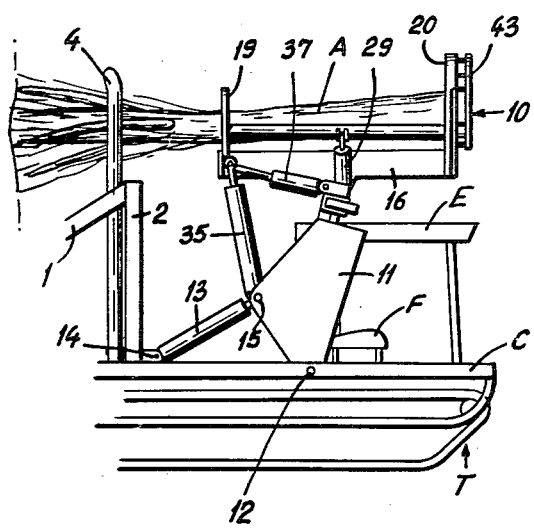
FIGURE 3 is a view similar to that of FIGURE 2, but showing the head in its uppermost loading position.

The mechanism in accordance with the invention consists of a head 10 which is disposed forwardly and on one side of the motor vehicle opposite to the side of the control cab. The head 10 is supported by and connected by a universal joint to the front end of a bracket 11 which is itself pivotally mounted on the frame C of the vehicle for vertical pivotal movement about a horizontal axle 12 disposed transversely of the long axis of the vehicle. The bracket 11 has a generally triangular shape, as shown in FIGURES 1, 2 and 3 and can pivot about axle 12 between a substantially horizontal rest position, shown in FIGURE 1, in which the bracket rests on top of frame C, and a nearly vertical position, as shown in FIGURE 3, in order to raise the entire head assembly from a substantially vertical position, shown in FIGURE 1, to an elevated substantially horizontal position, shown in FIGURE 3, the head in this latter position being substantially level with the transverse member 3 of the tree holding mechanism. Bracket 11 is actuated by a hydraulic cylinder piston unit 13 pivotally connected to the frame C at 14 and to the top of the bracket 11 at 15.

The head 10 consists of a heavy beam 16 preferably of tubular construction and having a rectangular cross-section, but which may be in the form of an I-beam. Curved plates are secured to the upper and lower ends of the beam 16 and are perpendicular to the long axis of said beam. On one side of the beam, these plates form fixed upper and lower jaws 17 and 18 respectively. These curved plates are provided at their ends opposed to the fixed jaws with pivotally mounted upper and lower movable jaws 19 and 20 respectively pivoted in 21 and 22 respectively on points which lie along a line parallel to the long axis of the vertical beam. The two movable jaws are rigidly interconnected by means of a vertical tube 23 which is axially outwardly offset from the pivot points 21 and 22. The movable jaws 19 and 20 are further reinforced by inclined braces 24 connecting the respective jaws to the tube 23 (see FIGURE 4).

The center portion of tube 23 is provided with ears 25 which overlap two horizontal plates 26 being pivoted thereon by means of pin 27. The plates 26 are rigidly secured to beam 16 and to one of the ears 28 themselves rigidly secured to the sides of the beam 16 and rearwardly projecting from the center thereof. The movable jaws 19 and 20 are pivotable between an open position shown in full line in FIGURES 4 and 5, and a closed position shown in dotted lines in the same figures, by means of a double acting cylinder and piston unit 29 which is pivoted at 30 between plates 26 and at 31 to the ends of lugs 32 secured to tube 23.

Head 10 is pivotally connected to the front end of bracket 11 by means of a universal joint consisting of a sleeve 33 rotatably mounted on a stud shaft 33' which projects outwardly from and is rigidly secured to bracket 11 at the front thereof and which is disposed parallel to the bottom face of bracket 11 so as to be substantially horizontal on an axis parallel to the long axis of the motor vehicle T when the bracket 11 is in its rest horizontal position (shown in FIGURE 1). The universal joint further comprises a transverse pivot shaft 34 perpendicular to the axis of sleeve 33 and secured to said sleeve and on which are pivoted the ears 28 rigid with beam 16. Thus, beam 16 can pivot in a vertical plane parallel to the long axis of the vehicle by pivoting about pivot shaft 34 (as shown by the double arrows in FIGURE 1) and can also pivot transversely to the long axis of the vehicle T about the axis of sleeve 33 in order to vary the lateral inclination of the head as indicated by the double arrows in FIGURE 6.

A double acting cylinder and piston unit 35 is pivotally connected at 15 to the top of bracket 11 and at 36 by means of a universal joint to the top portion of beam 16 and serves to move the head 10 in a plane parallel to the long axis of the vehicle and relatively to bracket 11 as shown in FIGURES 1 and 2. A double acting cylinder and piston unit 37 is pivotally connected at 36 to the top of beam 16 by means of a universal joint and is pivotally connected at its lower end at 39 to a laterally extending plate 40 secured to bracket 11. This cylinder unit 37 causes pivotal movement of the head in a transverse plane as shown in FIGURE 6.

A point or spike 41 is secured to beam 16 at the front face thereof at the level of the upper jaws 17 and 19 as shown in FIGURE 5 and a straight cutting blade 42 is secured to beam 16 at the level of the lower jaws as shown in FIGURE 4. When head 10 engages a standing tree, the latter is pressed against blade 42 and spike 41 by the movable jaws 19 and 20 which close over the tree under the action of hydraulic cylinder unit 29. The force exerted by said unit 29 is sufficient to cause the spike 41 and blade 42 to dig into the tree for about one and a half to two inches.

The lower fixed jaw 18 of head 10 is extended by a guard 43 illustrated in FIGURES 4 and 6 which is composed of two superposed plates spaced to receive and protect a mechanical chain saw 44, the blade 45 of which carries a saw chain 46. The blade 45 is pivoted at 47 to the guard 43 in order to move from an inactive position within guard 43 inwardly towards and in the plane of cutting blade 42, as shown by the double arrow in FIGURE 4, in order to cut the tree trunk clamped by the jaws of the head just below the level of the lower jaws as shown in FIGURE 6. The chain saw is manually pivoted by means of rod 48 which is an upward extension of the pivot 47 (see FIGURES 4 and 6) and which is rigid with the saw blade 45 of the chain saw. Rod 48 has a right angle extension which is accessible to the driver of the motor vehicle. The saw chain 46 is actuated by a hydraulic motor 49 secured to blade 45 of the saw and fed with hydraulic fluid under pressure by tubing 50. More specifically the housing of motor 49 is disposed above guard 43 but has an integral sleeve which surrounds the motor shaft and freely extends through a notch 43' made in the top plate of guard 43 and is secured to the saw blade 45. The motor shaft has a gear meshing with saw chain 46 in conventional manner. Thus, the motor 49 is free to move in an arcuate path with respect to guard 43 as only the motor shaft and shaft sleeve extends through notch 43'. A by-pass tube (not shown) of hydraulic fluid opens on the chain 46 for oiling the same. An adjustable stopper 51 secured to top plate of guard 43, serves to adjust the limit inner position of the saw by abutting against the housing of motor 49. This limit position is preferably such that the saw is slightly spaced from straight blade 42. In the inactive position of chain saw 44, the shaft surrounding sleeve of the motor housing abuts against the edge of notch 43'.

The three hydraulic cylinders and piston units for actuating head 10 and bracket 11 and also the hydraulic cylinder 29 together with the hydraulic cylinders for actuating the curved arms 44 of the holding mechanism are all fed with hydraulic fluid by a central pump driven by the engine of the motor vehicle T and controlled by valves operated by control levers indicated at 52 (FIGURE 7) accessible to the driver of the vehicle.

The apparatus in accordance with the invention operates in the following manner:

The driver or operator causes the vehicle to move forwardly in order that head 10 may engage a tree and the operator operates the head 10 to incline the same about its universal joint in order to bring the beam 16 parallel to the tree. It is to be noted that in order to obtain this result the head 10 can be tilted laterally and longitudinally with respect to the vehicle. The operator then actuates the cylinder 29 to close the movable jaws 19 and 20 over the tree and said jaws press the tree against spike 41 and blade 42 which enter into the wood of the tree. The operator thereafter starts motor 49 of the chain saw and turns rod 48 to bring the chain saw 44 against the base of the tree to thereby cut the latter. When the saw has attained is limit position which is slightly spaced from about one and a half to one inch from blade 42, head 10 is slightly inclined rearwardly with respect to the vehicle in order to disengage and release the saw which can then be easily returned to its inoperative position within guard 43. The saw is elastically urged into this inactive position by means of a spring, not shown. If necessary, the vehicle is then slightly advanced in order to complete the severing of the tree from its stump or base. Head 10 is thereafter inclined rearwardly by actuating cylinder 35 until it has attained its limit retracted position and head 10 is inclined laterally by actuating cylinder 37 in order to bring the tree over or tilt the tree over the transverse member 3 towards the center of the latter in order to avoid the arched arm 4 which is disposed immediately rearwardly of the vehicle on the same side as head 10. The hydraulic cylinder 13 is finally actuated in order to raise bracket 11 and the head 10 which still firmly holds the tree. The tree is thus tilted more and more and helps in the pivoting of the assembly of the head 10 and bracket 11 about the transverse axle 12 and therefore assists the action of cylinder 13.

The assembly of head 10 and bracket 11 is elevated until the head 10 attains its horizontal position, as shown iln FIGURE 3, the left hand curved arm 4 being in its opened position, as shown in FIGURE 7. The movable jaws 19 and 20 are then opened and the tree is released. Because the tree extends a substantial distance at the back of the vehicle, the center of gravity of the tree is spaced rearwardly of the upper jaws 17 and 19 of head 10 and therefore the tree, when released by the movable jaws, tilts automatically towards the back of the vehicle, and the tree trunk now rests only on the upper jaws. The operator then actuates the cylinder which causes closing movement of curved arm 4 which is disposed immediately rearwardly of the head in order to close said arm in accordance with the arrow shown in FIGURE 7. Chain 5 of the curved arm 4 engages the tree and pushes the same laterally over the upper jaw 17 whereby the tree trunk is displaced upwardly and towards the center of the vehicle. The tree can thus be stacked over other tree trunks A' which are already loaded on transverse member 3. When the head 10 is clear of the tree, it is returned to its substantially vertical position as shown in FIGURE 1.

The curved arm 4 is moved toward the other arm 4 in order to retain the trees on the vehicle and the latter can be moved to another location for cutting and loading another tree while pulling the stack of trees already loaded thereon.

It is noted that the mechanism in accordance with the invention operates in the manner of the fore arm and hand of a human person. Bracket 11 would correspond to the fore arm, the axis 12 corresponding to the elbow whereas the universal joint constituted by sleeve 33 and pivot 34 corresponds to the wrist while the jaws of the head 10 correspond to the thumb and fingers of a hand.

This mechanism can engage a tree which is inclined with respect to the ground in any direction and can cut said tree very close to the ground. The tree is continuously controlled during its fall. When several trees have been loaded on the vehicle the latter can pull these trees to the delimbing and cutting site as explained in co-pending patent application noted above and entitled "Tree Holding Means for Motor Vehicles" Serial No. 74,946, now U.S. Patent No. 3,008,731. Thus the vehicle of the present invention together with the tree holding mechanism can cut and transport whole trees to a central delimbing and cutting site.

The apparatus together with the method of forestry operation which it renders possible avoids cluttering of the forest with branches and the like. In experiments carried with the machine of the invention in very rough ground, it has been possible to cut trees at the rate of one per 55 seconds and to transport about 10 trees per journey to the delimbing and cutting site. Each machine can thus cut the equivalent of 20 to 25 cords of wood per day, that is about 200 trees per day.

While a preferred embodiment in accordance with the present invention has been illustrated and described, it is understood that various modifications may be resorted to without departing from the spirit and scope of the appended claims.

What I claim is:

1. A machine for cutting, loading and transporting trees comprising a motor vehicle, a head consisting of a beam provided with at least two pairs of jaws spaced from each other along said beam, jaws of each pair being pivoted for opening and closing movement in order to encircle and clamp the trunk of a standing tree at two spaced zones of said tree trunk, tree trunk cutting means mounted on said beam below the lower pair of jaws for cutting the tree, first motor means for actuating said pivotable jaws, universal pivotal means pivotally connecting said head to said vehicle for pivotal movement of said head in a vertical plane longitudinally of said vehicle between a substantially upright position in front of said vehicle and a substantially horizontal position over said vehicle, and for pivotal movement of said head transversely of said vehicle, second motor means for pivoting said head in a vertical plane rearwardly over the vehicle to thereby tilt the tree over said vehicle, with the top of the tree projecting rearwardly of the vehicle, third motor means for pivoting said head transversely of said vehicle, tree support means mounted on said vehicle, at the back of said head, for receiving and supporting the trunk of the thus inclined tree trunk and means for disengaging the tree trunk from said head after opening of said jaws whereby the head can be pivoted towards the front of the vehicle for encircling and cutting another tree.

2. A machine for cutting, loading and transporting trees comprising a motor vehicle, a head pivotally mounted at the front of said vehicle and consisting of a beam provided with at least two pairs of jaws spaced from each other along said beam, jaws of each pair being pivoted for opening and closing movement in order to encircle and clamp the trunk of a standing tree at two spaced zones of said tree trunk, tree trunk cutting means mounted on said beam below the lower pair of jaws for cutting the tree, motor means for pivoting said head in a vertical plane rearwardly of the vehicle to thereby tilt the tree over said vehicle, with the top of the tree projecting rearwardly of the vehicle, support means mounted on said vehicle, at the back of said head, for receiving and supporting the trunk of the thus inclined tree and means for disengaging the tree trunk from said head after opening of said jaws, whereby the head can be pivoted towards the front of the vehicle for encircling and cutting another tree, the pivotal connection of said head to said vehicle comprising an elongated bracket at the forward end of which said head is pivotally connected by means of a universal joint, the back end of said bracket being pivoted to said vehicle for pivotal movement of said bracket and of said head in a vertical plane substantially parallel to the long axis of said vehicle in order to raise said head and incline the same over the vehicle, said motor means for pivoting said head comprising first motor means connected between said bracket and said vehicle in order to pivot said bracket with respect to said vehicle and second motor means connected between said bracket and said head for pivoting the latter with respect to said bracket about said universal joint.

3. A machine as claimed in claim 2, wherein said first and second motor means consist of hydraulic cylinder and piston units connected between said bracket and said vehicle and between said bracket and said head respectively.

4. A machine for cutting, loading and transporting trees comprising a motor vehicle, a head pivotally mounted at the front of said vehicle and consisting of a beam provided with at least two pairs of jaws spaced from each other along said beam, jaws of each pair being pivoted for opening and closing movement in order to encircle and clamp the trunk of a standing tree at two spaced zones of said tree trunk, tree trunk cutting means mounted on said beam below the lower pair of jaws for cutting the tree, motor means for pivoting said head in a vertical plane rearwardly of the vehicle to thereby tilt the tree over said vehicle, with the top of the tree projecting rearwardly of the vehicle, support means mounted on said vehicle, at the back of said head, for receiving and supporting the trunk of the thus inclined tree and means for disengaging the tree trunk from said head after opening of said jaws, whereby the head can be pivoted towards the front of the vehicle for encircling and cutting another tree, said pairs of jaws being mounted at the two ends of said beam, each pair of jaws comprising a fixed jaw and a movable jaw, said movable jaws being pivoted on said beam for movement in planes perpendicular to said beam towards said fixed jaws in order to encircle and clamp a tree, said movable jaws being further rigidly interconnected by a rigid member disposed parallel to said beam, and motor means disposed between said beam and said rigid member to pivot said movable jaws.

5. A machine as claimed in claim 4, further including sharp elements disposed at the level of said jaws and secured to said beam in order to engage a tree clamped by said jaws.

6. A machine as claimed in claim 5, wherein said tree trunk cutting means include a mechanical chain saw mounted for pivotal movement under the lower fixed jaw, a guard secured to said latter jaw and in which said chain saw can be inserted and a control rod secured to said saw and accessible to the operator of the vehicle to pivot said mechanical saw about its pivot on said lower fixed jaw.

7. A machine as claimed in claim 1, wherein said support means include a transverse member mounted on said vehicle at substantially the center thereof and above the vehicle, said head being mounted forwardly and on one side of said vehicle and capable of oscillating between said substantially vertical position and a substantially horizontal position above the vehicle and substantially level with one end portion of said transverse member in order to load a tree trunk thereon, said means for disengaging the tree trunk from said head including a power member for shifting the tree trunk laterally of said vehicle, off said head and on said transverse member.

References Cited in the file of this patent
UNITED STATES PATENTS

| | | |
|---|---|---|
| 1,897,120 | Davey | Sept. 27, 1932 |
| 2,130,117 | Butts | Sept. 13, 1938 |
| 2,992,941 | Pope | Apr. 21, 1959 |
| 3,008,731 | Bombardier | Nov. 14, 1961 |

OTHER REFERENCES

Newsweek, page 41, Feb. 21, 1955.